(12) United States Patent
Melesko et al.

(10) Patent No.: US 6,428,030 B2
(45) Date of Patent: Aug. 6, 2002

(54) SELF-CENTERING TRAILER HITCH

(76) Inventors: Steven David Melesko, 2060 Fisher Road, Kelowna BC (CA), V1W 2H2; Charles Allen Winslow, P.O. Box 15, 109 Tingley Street, Ashcroft BC (CA), V0K 1A0

( * ) Notice: Subject to any disclaimer, the term of this patent is extended or adjusted under 35 U.S.C. 154(b) by 0 days.

(21) Appl. No.: 09/837,256

(22) Filed: Apr. 19, 2001

Related U.S. Application Data

(60) Provisional application No. 60/198,740, filed on Apr. 21, 2000.

(51) Int. Cl.[7] .................................................. B60D 1/40
(52) U.S. Cl. ................. 280/477; 280/479.3; 280/491.2; 280/511
(58) Field of Search ................................. 280/477, 511, 280/479.2, 479.3, 491.1, 491.2, 491.3, 491.4, 494, 499, 514, 460.1, 459, 456.1, 462, 478.1, 482

(56) References Cited

U.S. PATENT DOCUMENTS

| | | | | |
|---|---|---|---|---|
| 2,306,007 A | * | 12/1942 | Thorp | |
| 3,675,947 A | | 7/1972 | Blagg | |
| 3,794,355 A | * | 2/1974 | Crocolice | ................... 280/482 |
| 3,964,767 A | * | 6/1976 | Williams | ................... 280/477 |
| 4,057,266 A | * | 11/1977 | Duncan et al. | ............. 280/475 |
| 4,254,968 A | | 3/1981 | DelVecchio | |
| 4,560,183 A | | 12/1985 | Cook | |
| 4,811,967 A | | 3/1989 | Hensley | |
| 4,861,061 A | * | 8/1989 | Franz | ................... 280/479.2 |
| 4,903,978 A | | 2/1990 | Schrum, III | |
| 4,991,865 A | | 2/1991 | Francisco | |
| 5,009,446 A | | 4/1991 | Davis | |
| 5,080,386 A | | 1/1992 | Lazar | |
| 5,161,815 A | | 11/1992 | Penor, Jr. | |
| 5,236,215 A | * | 8/1993 | Wylie | |
| 5,277,446 A | * | 1/1994 | Hamel | |
| 5,330,196 A | * | 7/1994 | Ricles | |
| 5,429,382 A | * | 7/1995 | Duncan | ................... 280/491.4 |
| 5,503,422 A | * | 4/1996 | Austin | |
| 5,529,330 A | * | 6/1996 | Roman | |
| 5,697,630 A | * | 12/1997 | Thompson et al. | |
| 5,797,616 A | * | 8/1998 | Clement | ................... 280/477 |
| 6,209,902 B1 | * | 4/2001 | Potts | ................... 280/477 |

FOREIGN PATENT DOCUMENTS

| | | |
|---|---|---|
| CA | 833427 | 2/1970 |
| CA | 1268794 | 5/1990 |
| CA | 1309433 | 10/1992 |
| CA | 2171813 | 9/1997 |
| CA | 2162767 | 10/1999 |

* cited by examiner

Primary Examiner—Anne Marie Boehler
(74) Attorney, Agent, or Firm—Antony C. Edwards

(57) ABSTRACT

A self-centering trailer hitch includes first and second telescopic arms, each of the telescopic arms having first and second opposite ends. The first ends of the telescopic arms are pivotally mounted to a hitch hood coupler for coupling the first ends of the telescopic arms releasably to the hood of a trailer hitch. The second ends of the telescopic arms are adapted to be pivotally mounted to a rear end of a towing vehicle, mountable to the vehicle forward relative to a hitch ball mounted to the vehicle. The second ends of the telescopic arms when mounted to the rear end of the vehicle are disposed on laterally opposite sides of the hitch ball.

20 Claims, 2 Drawing Sheets

FIG. 1

SELF-CENTERING TRAILER HITCH

CROSS REFERENCE TO RELATED APPLICATION

This application claims priority from United States Provisional Patent Application No. 60/198,740 filed Apr. 21, 2000 entitled Self-Centering Trailer Hitch.

FIELD OF THE INVENTION

This invention relates to the field of trailer hitch guides, and in particular to a self-aligning trailer hitch guide employing a pair of telescopic triangulating arms which guide a hitch onto a ball by triangulated urging of the hitch into lateral alignment with the ball and vertical alignment by means of at least one ramp.

BACKGROUND OF THE INVENTION

Applicant is aware of numerous references in the prior art in an attempt to provide trailer hitch coupling guides, in particular; U.S. Pat. No. 5,236,215 which issued to Wylie on Aug. 17, 1993 for a Trailer Hitch Coupling Guide; U.S. Pat. No. 5,454,582 which issued to Rines on Oct. 3, 1995 for an Apparatus for Hitching a Trailer Coupler to a Hitch Ball; U.S. Pat. No. 4,678,220 which issued to Danielson on Aug. 18, 1987, for Trailer Hitch Coupling Device; U.S. Pat. No. 5,697,630 which issued to Thompson et al on Dec. 16, 1997 for a Hitching-Apparatus; U.S. Pat. No. 5,529,330 which issued to Roman on Jun. 25, 1996 for Hitch Helper; U.S. Pat. No. 5,503,422 which issued to Austin on Apr. 2, 1996 for Hitch Alignment Apparatus and Method; U.S. Pat. No. 5,080,386 which issued to Lazar on Jan. 14, 1992 for Self-Aligning and Self-Connecting Trailer Hitch; U.S. Pat. No. 5,630,606 which issued to Ryan on May 20, 1997 for Trailer Hitch with Extensible Throat; U.S. Pat. No. 5,382,042 which issued to McPhee et al on Jan. 17, 1995 for Towing Device Support; U.S. Pat. No. 5,277,446 which issued to Hamel on Jan. 11, 1994 for Trailer Hitch Coupling Device; U.S. Pat. No. 5,330,196 which issued to Ricles on Jul. 19, 1994 for Trailer Hitch Guide; U.S. Pat. No. 4,560,183 which issued to Cook on Dec. 24, 1985 for Trailer Hitch Guide; U.S. Pat. No. 4,254,968 which issued to DelVecchio on Mar. 10, 1981 for Removable Ball Guide Attachment for Trailer Hitches; and, U.S. Pat. No. 3,675,947 which issued to Blagg for Coupler-aligning Trailer Hitch.

Because none of the above references describe self-aligning trailer hitches having a coupling guide which includes a pair of opposed telescopic arms, it is one object of the present invention to provide same.

SUMMARY OF THE INVENTION

In summary, the self-centering trailer hitch of the present invention includes first and second telescopic arms, each of the telescopic arms having first and second opposite ends. The telescopic arms are intended to include any form of extendible arms which extend and retract between fully extended and fully retracted positions. The first ends of the telescopic arms are pivotally mounted to a hitch hood coupler for coupling the first ends of the telescopic arms releasably to the hood of a trailer hitch. The second ends of the telescopic arms are adapted to be pivotally mounted to a rear end of a towing vehicle, mountable to the vehicle forward relative to a hitch ball mounted to the vehicle. The second ends of the telescopic arms when mounted to the rear end of the vehicle are disposed on laterally opposite sides of the hitch ball.

In one embodiment a ramp is mountable to the end of the vehicle, and when so mounted is adapted to engage, at a lower end of the ramp, the guide linkage made up of the first and second arms and hitch hood coupler. The ramp elevates the guide linkage up the ramp as the hitch hood coupler is translated in a first direction towards a retracted vertex position defined by the position of the hitch hood coupler when the first and second telescopic arms are in their fully retracted position. The retracted vertex position coincides with vertical alignment of the hitch hood, when mounted to the hitch hood coupler, vertically over the hitch ball. The guide linkage disengages from an upper end of the ramp as the hitch hood coupler is urged into the retracted vertex position so as to drop the hitch hood onto the hitch ball. In embodiments not using a ramp, for example relying on a wheel on a telescoping support mounted under the hitch hood arm of the trailer, once in the retracted vertex position the wheel is retracted to lower the hitch hood onto the ball.

Stop means on the telescopic arms limit the linear range of telescopic motion available to each telescopic arm. The telescopic arms thus form, when viewed in plan view, a triangle having its vertice at the hitch hood coupling where the first ends of the telescoping arms are mounted to the hitch hood coupler, the remaining two vertices of the triangle being formed between the second ends of the telescopic arms and the rear end of the towing vehicle. When viewed this way, the position of the hitch ball falls within the bounds of the triangle within the limits that, when the telescopic arms are both fully collapsed against the stop means, that the vertice of the triangle defined by the hitch hood coupler coincides with the position of the hitch ball.

When the telescopic arms are fully extended, the vertice defined by the hitch hood coupler is aligned longitudinally with the hitch ball. When the telescopic arms are in between their fully extended and fully retracted positions, the shape of the plan view triangle formed by the telescopic arms may vary, and where the hitch hood is being translated towards the hitch ball and is not aligned longitudinally with the hitch ball, the plan view triangle is non-isosceles, the vertice defined by the hitch hood coupler being constrained by the lateral range of motion both telescopic and angular of each telescopic arm, the limits of such ranges of motion being constrained by the stop means of the telescopic arms which prevent over-extension of the arms and over-retraction of the arms. The result is that the available ranges of motion of the hitch hood coupler are convergingly restrained as the telescopic arms retract during translation of the hitch hood towards the hitch ball, such convergence of the available ranges of motion diminishing to substantially zero as the hitch hood coupler is translated so as to be vertically aligned over the hitch ball.

As the hitch hood coupler is translated towards the hitch ball, with the corresponding retraction of the telescopic arms as the available ranges of motion converge, at least one inclined ramp engages either the hitch hood coupler or a corresponding one of the telescopic arms, in one embodiment a pair of such inclined ramps disposed oppositely on either side of the hitch ball engaging both of the telescopic arms, so as to elevate the hitch hood coupler over the hitch ball as the hitch hood coupler approaches vertical alignment with the hitch ball. Once the hitch hood coupler becomes vertically aligned over the hitch ball, the telescopic arms or the hitch hood coupler itself, depending on the location of the ramp, fall off the uppermost end of the ramp or ramps so as to fall under the force of gravity onto the hitch ball, thereby completing the coupling of the hitch hood onto the ball.

DETAILED DESCRIPTION OF EMBODIMENTS OF THE INVENTION

The problem addressed by the present invention is that encountered when backing a vehicle so as to align a trailer ball, rigidly mounted to the vehicle, with a corresponding hitch on a trailer. Typically, the view behind the vehicle is obscured so that a driver has only an approximate idea of the alignment of the trailer ball with the hitch, and in particular the hitch hood. The result is that often the hitch hood does damage to the bumper of the vehicle as the vehicle is misaligned and backed into the hitch hood.

Figure 1:
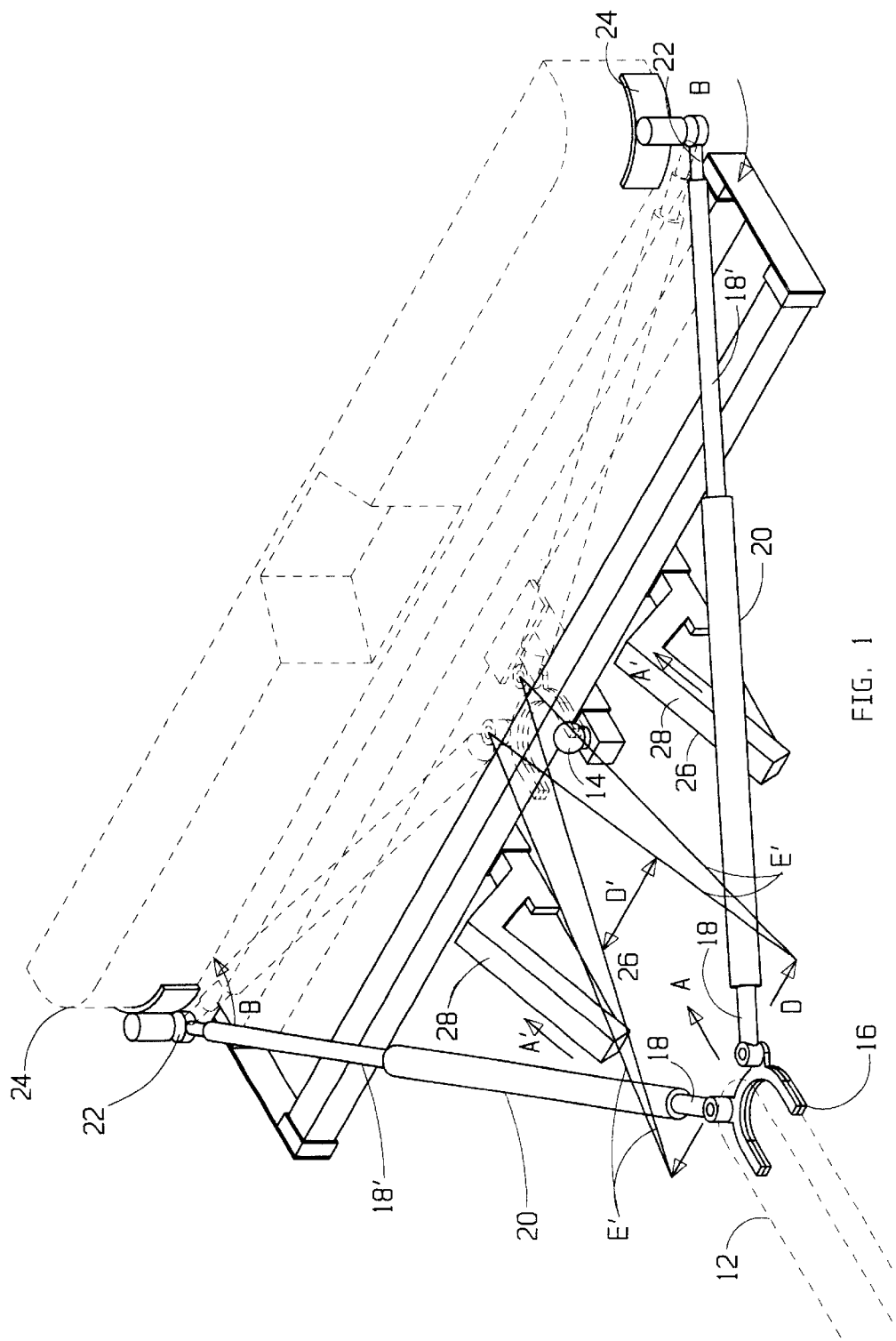
FIG. 1 is, in perspective view, the self-centering trailer hitch guide of the present invention mounted between a trailer hitch and a vehicle bumper, the trailer hitch guide in its extended position.
Figure 2:
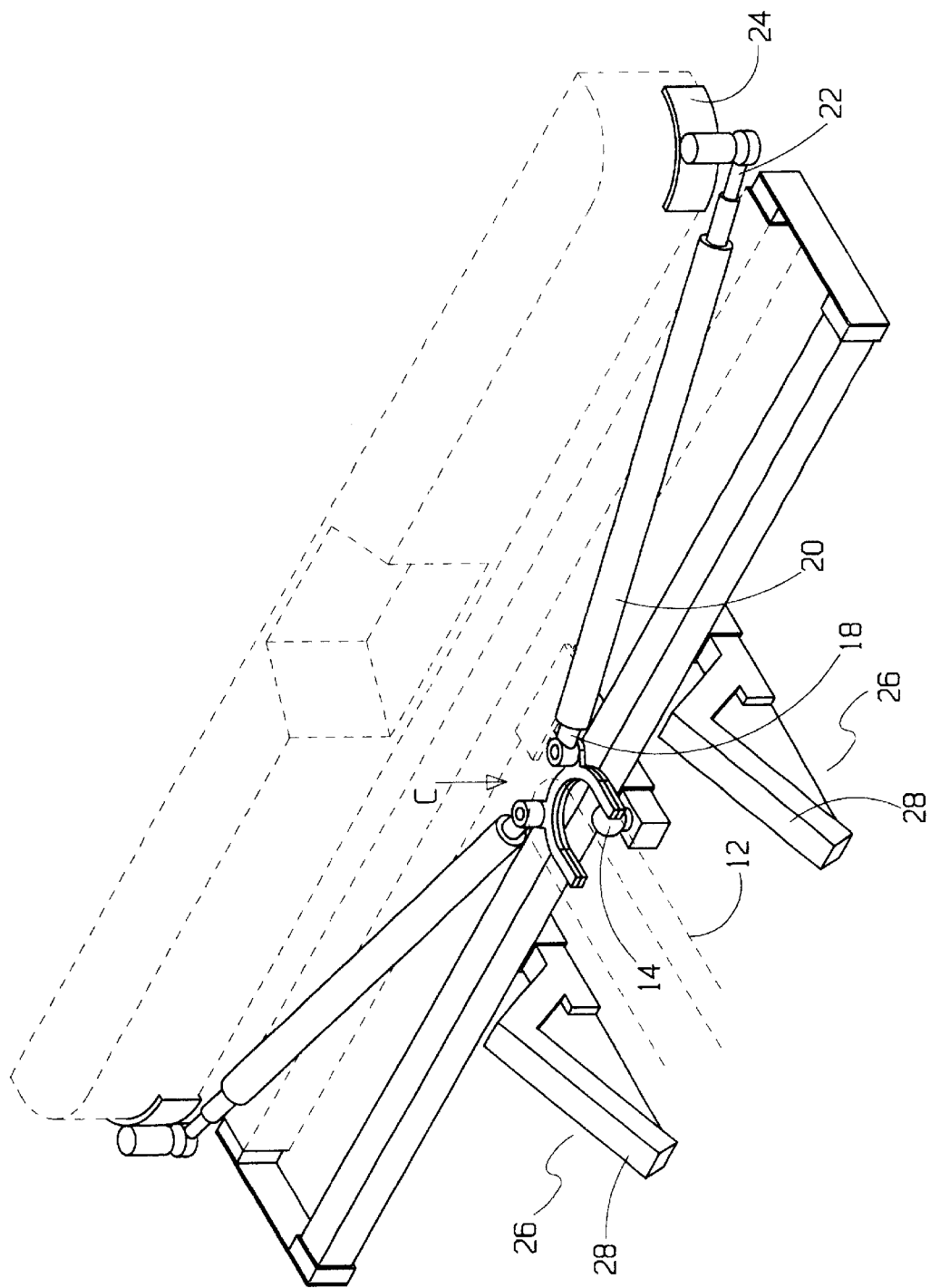
FIG. 2 is, in perspective view, the self-centering trailer hitch guide of FIG. 1, with the trailer hitch guide in its retracted position so as to align the trailer hitch over the ball.

As seen in FIGS. 1 and 2, it is desired to place the end of hitch 12 (the hitch hood shown in dotted outline) onto hitch ball 14. To accomplish this, a hitch hood coupler such as coupling 16 is releasably mounted onto the end of the hitch hood of hitch 12. Coupling 16 may take many forms such as a vertical pin or a "U"-shaped clamp such as seen in FIGS. 1 and 2. Struts or rods 18 are releasably pivotally coupled onto coupling 16. The opposite ends of struts 18 are slidably, for example telescopically, mounted within tubes or hydraulic or pneumatic cylinders 20. Cylinders 20 are rigidly mounted to swing arms 22 which themselves are pivotally releasably mounted to the vehicle frame or bumper or other rigid member 24 rigidly mounted to the vehicle (not shown). Hitch ball 14 is also rigidly mounted to the frame 24 directly or indirectly via the hitch, as are ramp members 26.

Thus, with struts 18 releasably coupled by coupling 16 to hitch 12, as the vehicle is driven in reverse so as to translate hitch 12 in direction A in relative motion relative to ball 14, struts 18 or cylinders 20 engage ramp surfaces 28 on ramp members 26 and slide upwardly in direction A' along ramp surfaces 28 so as to elevate hitch 12 relative to ball 14. As hitch 12 is elevated over ramp surfaces 28, struts 18' telescopically retract into cylinders 20 relative to swing arms 22, and swing arms 22 pivot in directions B relative to rigid member 24. Thus as struts 18 or cylinders 20 come clear of the uppermost ends of ramp surfaces 28 as hitch 12 is translated in direction A', hitch 12 drops downwardly in direction C so as to engage ball 14.

Stops may be rigidly mounted to swing arms 22 so as to stop the sliding telescopic travel of the cylinders or struts as swing arms 22 pivot in direction B, that is, as hitch 12 approaches alignment over ball 14. Alternatively the stopping function may be provided by the cylinder stroke bottoming-out. The stopping function ensures that hitch 12 is urged towards lateral alignment over ball 14 as hitch 12 approaches ball 14 in direction A'. Such urging is the result of the range of motion available to hitch 12, when viewed in plan view, being constrained to converge from a wide range of motion D governed by the fully extended stroke of the telescopic arms and a narrowing or converging range of motion D' as hitch 12 approaches ball 14, as converging constrained by the corresponding motion paths E and E' of the ends of struts 18, shown by way of example only to be linear. Once hitch 12 is laterally and vertically longitudinally aligned over ball 14, the hitch hood is free to drop down onto ball 14 as struts 18' or cylinders 20 clear ramp surfaces 28 in direction A'. Once so coupled, struts 18 are uncoupled from hitch 12 by releasing coupling 16.

In an alternative embodiment, ramps 26 are replaced by a skid plate under the leading edge of coupling 16. Thus, instead of the cylinders or struts riding up over the ramps, a skid plate slides up over hitch ball 14.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A self-centering trailer hitch comprising a guide linkage, said guide linkage comprising a hitch hood coupler and first and second telescopic arms, each of said first and second telescopic arms having opposite first and second ends, said first ends pivotally mounted to said hitch hood coupler for releasably pivotally coupling said first ends to a hitch hood, each said first and second telescopic arms telescopically extendable and retractable between fully extended and fully retracted positions, said second ends pivotally mountable to an end of a vehicle, adjacent a hitch ball mounted to the towing vehicle, a ramp mountable to said end of said vehicle, and when so mounted adapted to engage, at a lower end of said ramp, said guide linkage and elevate said guide linkage up said ramp as said hitch hood coupler is translated in a first direction towards a retracted vertex position defined by the position of said hitch hood coupler when said first and second telescopic arms are in said fully retracted position, said retracted vertex position coinciding with vertical alignment of said hitch hood, when mounted to said hitch hood coupler, vertically over said hitch ball, said guide linkage disengaging from an upper end of said ramp as said hitch hood coupler is urged into said retracted vertex position so as to drop said hitch hood onto said hitch ball.

2. The device of claim 1 wherein said hitch hood coupler has a lateral range of motion convergingly constrained, by stop means cooperating with said first and second telescopic arms, from a diverged range of motion defined between the radial arcs of said first ends when said first and second telescopic arms are in their fully extended positions to a converged range of motion which is substantially zero at said retracted vertex position.

3. The device of claim 2 wherein said second ends are mountable equally laterally spaced on either side of said hitch ball.

4. The device of claim 3 wherein first and second telescopic arms have the same length when in said fully extended or said fully retracted positions.

5. The device of claim 2 wherein said hitch hood coupler is a U-shaped collar, snugly mountable onto a distal end of a hitch hood, the U-shape of said U-shaped collar opening away from said vehicle when said hitch guide is mounted to said vehicle.

6. The device of claim 1 wherein said first and second telescopic arms are resiliently resistive cylinders.

7. The device of claim 1 further comprising a second ramp, said first and second ramps mountable equi-distant on either side of said hitch ball so as to engage said first and second telescopic arms respectively.

8. The device of claim 1 wherein said ramp is a longitudinally aligned elongate member.

9. The device of claim 8 wherein said elongate member is rigidly supported by a mounting member mountable into a receiver hitch tube on said vehicle.

10. The device of claim 5 wherein said first ends are pivotally mounted to laterally opposite sides of said U-shaped collar.

11. A self-centering trailer hitch comprising a guide linkage, said guide linkage comprising a hitch hood coupler and first and second telescopic arms, each of said first and second telescopic arms having opposite first and second ends, said first ends pivotally mounted to said hitch hood coupler for releasably pivotally coupling said first ends to a hitch hood, each said first and second telescopic arms telescopically extendable and retractable between fully extended and fully retracted positions, said second ends pivotally mountable to an end of a vehicle, adjacent a hitch ball mounted to the vehicle, a ramp mountable to said end of said vehicle, and when so mounted adapted to engage, at a lower end of said ramp, said guide linkage and elevate said guide linkage up said ramp as said hitch hood coupler is translated in a first direction towards a retracted vertex position defined by the position of said hitch hood coupler when said first and second telescopic arms are in said fully retracted position, said retracted vertex position coinciding with vertical alignment of said hitch hood, when mounted to said hitch hood coupler, vertically over said hitch ball, said guide linkage disengaging from an upper end of said ramp as said hitch hood coupler is urged into said retracted vertex position so as to drop said hitch hood onto said hitch ball.

12. The device of claim 11 wherein said hitch hood coupler has a lateral range of motion convergingly constrained, by stop means cooperating with said first and second telescopic arms, from a diverged range of motion defined between the radial arcs of said first ends when said first and second telescopic arms are in their fully extended positions to a converged range of motion which is substantially zero at said retracted vertex position.

13. The device of claim 12 wherein said second ends are mountable equally laterally spaced on either side of said hitch ball.

14. The device of claim 13 wherein first and second telescopic arms have the same length when in said fully extended or said fully retracted positions.

15. The device of claim 12 wherein said hitch hood coupler is a U-shaped collar, snugly mountable onto a distal end of a hitch hood, the U-shape of said U-shaped collar opening away from said vehicle when said hitch guide is mounted to said vehicle.

16. The device of claim 11 wherein said first and second telescopic arms are resiliently resistive cylinders.

17. The device of claim 11 further comprising a second ramp, said first and second ramps mountable equi-distant on either side of said hitch ball so as to engage said first and second telescopic arms respectively.

18. The device of claim 11 wherein said ramp is a longitudinally aligned elongate member.

19. The device of claim 18 wherein said elongate member is rigidly supported by a mounting member mountable into a receiver hitch tube on said vehicle.

20. The device of claim 15 wherein said first ends are pivotally mounted to laterally opposite sides of said U-shaped collar.

* * * * *